US007343325B2

(12) United States Patent
Shaver et al.

(10) Patent No.: US 7,343,325 B2
(45) Date of Patent: Mar. 11, 2008

(54) METHOD AND SYSTEM FOR CONSTRUCTING PRICE STRUCTURES FOR COMPLEX PRODUCTS AND SERVICES

(75) Inventors: Allan B. Shaver, Unionville (CA); Cameron Conville, Toronto (CA); Mike Kostoff, Toronto (CA); John Krasnay, Whitby (CA); Dov Goldberg, Toronto (CA)

(73) Assignee: Teranet Enterprises Ltd., Toronto, Ontario (CA)

( * ) Notice: Subject to any disclaimer, the term of this patent is extended or adjusted under 35 U.S.C. 154(b) by 247 days.

(21) Appl. No.: 10/077,683

(22) Filed: Feb. 15, 2002

(65) Prior Publication Data

US 2003/0158784 A1 Aug. 21, 2003

(51) Int. Cl.
*G06Q 40/00* (2006.01)
(52) U.S. Cl. .................. 705/26; 705/35; 705/400
(58) Field of Classification Search ............ 705/400, 705/31
See application file for complete search history.

(56) References Cited

U.S. PATENT DOCUMENTS

| | | | |
|---|---|---|---|
| 4,970,655 A | 11/1990 | Winn et al. | |
| 5,878,400 A | 3/1999 | Carter, III | |
| 5,987,429 A | 11/1999 | Maritzen et al. | |
| 6,012,143 A | 1/2000 | Tanaka | |
| 6,029,145 A | 2/2000 | Barritz et al. | |
| 6,038,548 A | 3/2000 | Kamil | |
| 6,115,040 A | 9/2000 | Bladow et al. | |
| 6,189,146 B1 | 2/2001 | Misra et al. | |
| 6,233,682 B1 * | 5/2001 | Fritsch | 713/168 |
| 6,246,996 B1 | 6/2001 | Stein et al. | |
| 6,247,130 B1 | 6/2001 | Fritsch | |
| 6,282,653 B1 | 8/2001 | Berstis et al. | |
| 6,286,028 B1 | 9/2001 | Cohen et al. | |
| 6,658,568 B1 * | 12/2003 | Ginter et al. | 713/193 |
| 2001/0018680 A1 | 8/2001 | Park et al. | |

FOREIGN PATENT DOCUMENTS

| | | |
|---|---|---|
| CA | 2268377 A1 | 11/1999 |
| CA | 2348769 A1 | 3/2001 |
| CA | 2359133 A1 | 5/2001 |

OTHER PUBLICATIONS

B.S. Rubin, A.R. Christ and K.A. Bohrer, "Java and the IBM San Francisco Project", IBM Systems Journal, vol. 37, No. 3 (1998), <http://www.research.ibm.com/journal/sj/373/rubin.text>.

* cited by examiner

*Primary Examiner*—James A. Kramer
*Assistant Examiner*—Jocelyn Greimel
(74) *Attorney, Agent, or Firm*—Patterson & Sheridan, LLP

(57) ABSTRACT

The invention provides a system and method for constructing and maintaining a price structure for an e-commerce transaction relating to a complex product or service. A pricing tree is built of "price components" which include discrete revenues, price adjustments, taxes, and disbursements (such as royalties). Separate revenue streams, which may be allocated to different service providers, may have independent adjustment, tax, and disbursement treatments. Attributes may also be used in the calculation of separate components. Time-date adjustments and rate package adjustments are also supported. The system allows both automated calculation and accounting using the pricing tree. Transactions are supported by a modular e-commerce back-end platform.

49 Claims, 6 Drawing Sheets

UNITY™ Demo

Product Details Entry Page

Privacy Security Help

Select Product -> Product Details -> Confirm Pricing -> Credit Card -> Confirm Purchase Please enter details for: Government, and then click Next!

Purchase Quantity: |1| —401 lro: |50| —402

NumberOfPages: |125| — 403

[Next >>] [Cancel]

Product details

Government Id:3559  Product Category: Demo
- value add       (Revenue)
- PST             (Tax)
- GST             (Tax)
- statutory       (Revenue)
- Government      (Royalty)

Component Details

404 Revenues

| Name | Calculation | Category | Credit Account Number | |
|------|-------------|----------|----------------------|---|
| value add | quantity | Unit test | 64587634968 | —405 |
| statutory | NumberOfPages * 2 | Unit test | 32468736456 | —406 |

407 Taxes

| Name | Calculation | Applies To | Credit Account Number | |
|------|-------------|------------|----------------------|---|
| PST | total * 0.07 | | 548464963754 | —408 |
| GST | total * 0.08 | | 254674649867789 | —409 |

410 Royalties

| Name | Calculation | Debit Account Number | Credit Account Number | |
|------|-------------|---------------------|----------------------|---|
| Government | NumberOfPages * 1.5 | 457986654489 | 54878769878 (A/P) | —411 |

Fig. 4

UNITY™ Demo

Price Confirmation

Privacy Security Help

Select Product -> Product Details -> Confirm Pricing -> Credit Card -> Confirm Purchase Please confirm the product and price details for product: Government and then click Next!

Purchase quantity: 1
NumberOfPages: 125
lro: 50

| Total pre-tax: | 251.00 | —501 |
|---|---|---|
| GST | 0.08 | —502 |
| PST | 0.07 | —503 |
| Total: | 251.15 | —504 |

[Next>>] [Cancel]

Product details

Government, id = 3659

| Sequence Number | Component Name | Component Type | Amount | Calculation | Dependant Components | Debit Account | Credit Account | |
|---|---|---|---|---|---|---|---|---|
| 0 | value add | REV | 1.00 | quantity | | | 54587634968 | —505 |
| 1 | GST | TAX | 0.08 | total * 0.08 | 0 | | 254674649867789 | —506 |
| 2 | PST | TAX | 0.07 | total * 0.07 | 0 | | 548464968754 | —507 |
| 3 | statutory | REV | 250.00 | NumberOfPages * 2 | | | 32468736456 | —508 |
| 4 | Government | ROY | 187.50 | NumberOfPages * 1.5 | 3 | 457986654489 | 54878769878 (A/P) | —509 |

Fig. 5

METHOD AND SYSTEM FOR CONSTRUCTING PRICE STRUCTURES FOR COMPLEX PRODUCTS AND SERVICES

FIELD OF THE INVENTION

The invention relates to methods and systems for selling products and services over computer networks, and more particularly, to methods and systems for setting prices of products and services sold over computer networks.

BACKGROUND OF THE INVENTION

Electronic commerce systems for selling everything from books to real estate have become increasingly available. However, developing back-end transaction processing systems has required considerable skill and time invested in custom programming to meet the needs of the e-commerce provider. Development time can slow the entry of a new e-commerce provider to market. There is a need for a back-end platform to enable e-commerce providers to access standard components such as billing, pricing, accounting, customer care, and collection, allowing the providers to apply their own business rules without having to do expensive in-house or contracted custom programming. The providers should be able to focus, instead, on developing the front-end application that distinguishes them competitively. This custom front-end application should be able to communicate smoothly with the generic back-end system that provides the platform to define their products and services and support their transactions.

Generic back-end systems have been developed for certain e-commerce sectors. The IBM "San Francisco Project" was created to respond to the needs of small and medium-size merchants for a set of platform-independent business components, such as a general ledger. A US company, Peace Software, Inc., has also developed a component-based back-end platform, "Energy", specifically targetting regulated and competitive energy providers.

However, there is an outstanding need for a generic back-end system which allows complex products and services to be managed in a multiple provider environment.

An example of a complex product is any government product or service delivered through a private value-added reseller. Government products and services are increasingly delivered electronically. Some examples include government documents available for purchase online, and pay-per-use or subscription searching of government databases online. What makes such products "complex" is that they are characterized by a multi-party provider relationship. Ultimately, the government is the provider of the service (which may still be available in a manual or "over-the-counter" fashion). However, the service is now also available through the value-added reseller, who will participate in a portion of the fees collected. For instance, there are a number of online government payment services available today, which allow payment of parking tickets, property taxes, and licensing fees online. Gov One Solutions, LP and EZGov, Inc. are two known portal providers for these services.

These systems are accommodated today through specialty applications that must be customized for each new service provided. There is no readily available generic back-end e-commerce software to provide this functionality.

Complex products are also found in the online music and publishing realms, where online distributors agree to pay a royalty on each unit sale, license, or rental, which is commonly (but not always) determined as a fixed fee or percent of the overall price of the unit.

Pricing complex products and services, therefore, requires a sensitivity to these multiple components. In the most sophisticated examples, separate tax and discount/premium treatments are applied to each price component of a complex product. The challenge is not only to calculate the customer prices of such complex products or services, but to engage an automated system of accounting that represents this complexity, and allows for periodic reporting and auditing of the price components.

Many methods of automated price calculation are known. For instance, there are royalty tracking systems for music files distributed over computer networks that describe the automatic calculation of a royalty in terms of a fixed amount or variable amount (%) of the unit price. Examples are U.S. Pat. Nos. 6,247,130 and 6,233,682 to Fritsch, U.S. Pat. No. 6,282,653 to Berstis et al., and Canadian Patent Application No. 2,348,769 to Inoue et al.

Canadian Patent Application No. 2,359,133 to Lang et al. discloses a method and process for dynamic pricing calculation in a computer system. Lang describes a computer-assisted method for applying a series of price adjustments to a base price in sequence. The base prices of all products are stored in a database. All of the possible price adjustments are also stored. The method describes a process for successively querying price adjustments until all applicable price adjustments are applied to the base price. However, in operation, such a method would likely be cumbersome and inefficient with today's computing resources, since many non-applicable price adjustments would need to be reviewed for each calculation. Furthermore, the method does not specifically describe how the prices of complex products and services might be defined, calculated and accounted for.

The growing market for complex products and services delivered online demands that an efficient generic back-end system be provided which allows the flexibility and ease-of-use of a generic back-end system to be married with the sophistication of custom programming for complex product and service providers.

SUMMARY OF THE INVENTION

It is an object of the invention to associate the pricing structure of a product or service to the business relationship among multiple providers of that product or service.

It is a further object of the invention to allocate multiple revenue streams each with their own adjustment, tax and disbursement treatments to separate accounts in an accounting module, and to keep an appropriately detailed audit trail of the component allocations and how each was calculated.

It is a further object of the invention to allow a user to define a pricing structure for a product or service, setting calculation rules (expressions) to determine the value of individual components.

It is an aspect of the invention to provide a method of providing a price structure for a transaction relating to a product or service within an electronic commerce back-end platform. A product administration interface is provided for defining a preselected number of revenue streams for the product or service, and for defining business rules to determine a price structure of the product or service. A customer interface is provided for performing a transaction. A pricing tree of price components for a unit of a product or service is provided within a computer memory. The memory is responsive to both the product administration interface and the customer interface. A resulting price is generated based on a calculation of components in the pricing tree. The components include a first revenue stream allocable in whole or in part to a first provider, and a second revenue stream allocable in whole or in part to a second provider. The components stay discretely allocated within the computer memory after the calculation of the resulting price.

There may be more than two revenue streams. In addition, there may be one or more price adjustments (such as discounts or surcharges) applied to one or more of the revenue streams. Multiple price adjustments may be applied in a predetermined sequence, or they may be combined or substituted to take advantage of the lowest (best) available price for the customer.

The revenue streams may also individually be affected by one or more taxes. Tax-on-tax treatments are supported.

The method also tracks non-price-affecting notional components, such as disbursements. For tracking purposes, all or part of a revenue stream may be allocated as a disbursement to a particular provider (such as a royalty to an artist or musician). The amount of the disbursement may be fixed or variable, or subject to a complex calculation.

The revenue streams, price adjustments, taxes and disbursements are all components of the pricing tree. Once calculated, the resulting price is also treated as a component. Each component can include at least one user-defined attribute. An attribute may be price-affecting or non-price-affecting.

The method may also include applying a time/date argument in the calculation of any of the components (or the resulting price). This is especially useful in setting time-limited price adjustments (such as sales).

The method may include applying a rate package argument in the calculation of any of the components (or the resulting price). One or more rate packages may be associated to a customer. This is especially useful in setting preferential pricing for groups of customers.

The method may be applied, for example, to construct and maintain a price structure for an electronically-delivered government service or product, for which there are typically statutory and value-added revenue streams, each subject to their own adjustment, tax and disbursement treatments.

It is another aspect of the invention to provide a system for constructing and maintaining a price structure for transaction relating to a product or service within an electronic commerce back-end platform. The system includes:
  a product administration interface capable of receiving definitions of a plurality of price components and accepting business rules for manipulating the components;
  a customer interface capable of receiving information from a customer initiating the transaction.
  a processor, in communication with the product administration interface and the customer interface, executing software; and
  computer storage in communication with the processor to store the business rules and components.

The software includes a pricing tree builder for building a pricing tree of components, and a resulting price generator for calculating a resulting price from specific components according to the business rules. The storage is capable of storing the components so that they stay discretely allocated after the calculation of the resulting price.

The business rules preferably include expressions using the following operators: if, and, not, or, <, >, min, max, +, −, *, /, ( ). Support for unlimited future operators and functions is preferably provided within the software. Examples of possible future operators and functions include "**" (exponent); "today( )" (current date); and "daysDifference(day1,day2)". Preferably, no code change in the price calculation program or the Product Administration module should be required to add support for new expressions (i.e. the system is forward-compatible).

The expressions are preferably parsed using a parser in the software, which parses each node of the expression.

The electronic commerce back-end platform is preferably a modular platform to support an electronic commerce front-end application, having modules for pricing, billing, accounting, collection and customer care. The modules are in communication with each other within the platform. In a preferred embodiment, the modules comprise Enterprise Java Bean™ (EJB) components (not to be confused with the price "components" described herein). The EJB component model is used to create server-side components (called "beans"). The EJB model enables an application server platform to take care of some of the more difficult aspects of creating server code. An application server platform is a platform which allows business logic to be applied in a back-end level separate from the interface level but with brokering between the levels. The back-end can be run on one or more servers. EJB also facilitates the modularity of the back-end, by allowing parts of the software to be swapped in or out depending on the user's needs. EJB also features thread-safe processing, allowing multiple transactions to be processed simultaneously. It will be understood that the system can equally be implemented in computer languages other than Java, with appropriate modifications to port the system. Object-oriented languages would be more useful than procedural languages for the implementation of this type of platform.

It is a further aspect of the invention to provide a software program stored on a computer-readable medium.

BRIEF DESCRIPTION OF THE DRAWINGS

In order that the invention may be more clearly understood, the preferred embodiment thereof will now be described by way of example with reference to the accompanying drawings, in which:
FIG. 4 is a sample screen shot of a product information entry and component retrieval screen;
FIG. 5 is a sample screen shot of a price calculation screen.

DETAILED DESCRIPTION

Figure 1:
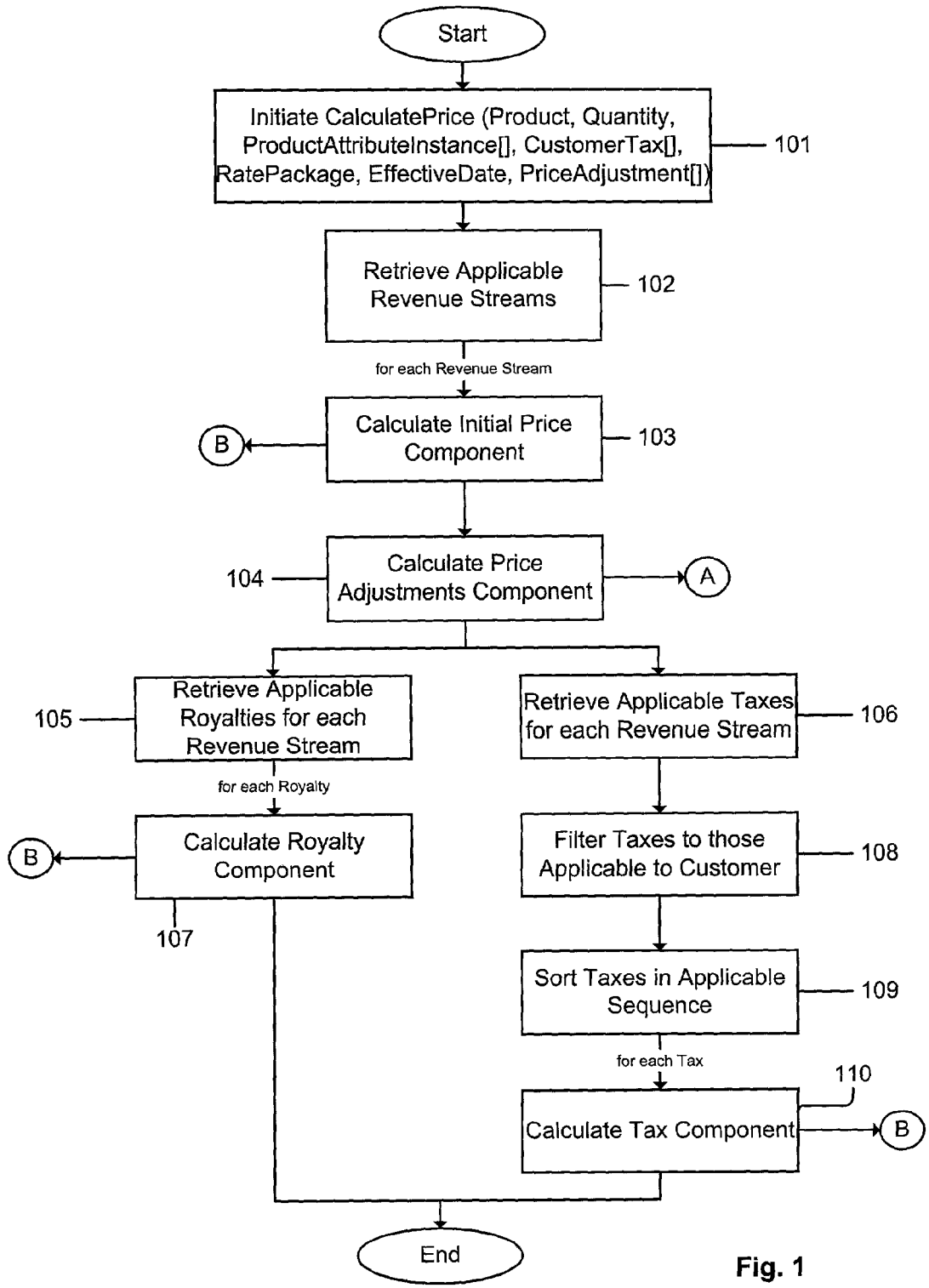
FIG. 1 is a flow diagram of the method.

According to the preferred embodiment, the invention provides a method and system enabling an electronic commerce application to maintain product or service information and calculate the price of a given complex product or service.

The invention allows a user-defined set of parameters for products and services to be applied in a price calculation method, which builds a tree structure of price components, in addition to calculating a resulting or total price for the end-customer of the product or service. "User" refers to a provider of an electronic commerce front-end application. The user enters information about its products and/or services for use in the back-end platform. The "user" is distinct from the "customer" who is the individual or entity purchasing, licensing or renting the product or service.

The result of the method is a tree of price components for a given product or service in a given transaction. The components are represented as a "pricing tree" since the multiple revenue streams create "branches" extending out to sub-branches representing the tax, price adjustment and disbursement treatments applied to each revenue stream branch. The invention allows the branches and sub-branches (components) to remain separately allocated, before, during and after the transaction. Therefore, the method is not merely a method of arriving at a total (resulting) price for the end-customer. Rather, the method treats price as more than a number—as a unique association of multiple discrete components, which accommodates the sophisticated price calculation and accounting procedures needed to process and manage transactions for complex products and services.

This way of constructing (or deconstructing) price is particularly useful in online businesses with multiple party providers (which have been described here as characteristic of complex products or services), where revenue streams for the product or service sold, rented or licensed by the parties flow separately to each party. For example, partners in a joint venture may each participate in the revenues of a product or service, and the participation may be defined among them as a percentage division, or as a fixed value-add amount on top of a base amount, or as another more complex distribution. However, this is also a useful approach for single-party businesses where the price of a product or service has functions of cost that are variable, effectively creating multiple "price components". For example, a restaurant selling fresh lobsters may charge a fixed amount on top of the variable cost of fresh lobsters (variable depending on the season and the supplier). Or, a law firm may charge a price for filing a patent application that includes its legal fees (determined by time spent in preparing an application in consultation with a client), government fees, goods and services tax on the legal fees, and passing through the cost of disbursements such as photocopying and courier charges.

The method and system presupposes an existing database structure comprising a series of rules and expressions for defined products or services. Through a Product Administration module (or similar product definition interface), the user is assisted in defining each a product or service, each with its own name, and optional code identifier, categor(ies) and descriptor(s), as well as, one or more revenue "streams" which each have their own names, categories and attributes. Importantly, each revenue stream can be associated to individual or multiple taxes, price adjustments and disbursements. Each of the revenues, as well as, each of the various "treatments" is a separate component. The price of a product or service can be split into an unlimited number of components.

When defining the revenue components of a particular product or service, the user is preferably asked to associate a General Ledger (GL) account to credit. When disbursements are applicable to the price, such as royalties, both Accounts Payable and GL accounts may be associated to each disbursement component, enabling the user to debit an expense and credit a payable. The payable may represent a specific GL account or it may identify a supplier/vendor identification number from a separate accounts payable system. An AP system can also be introduced later by modifying the account information for the product or service at that time.

In the Product Administration module, products and services and their revenue streams may be categorized to allow adjustments to be made, or tax or disbursement treatments to be applied, selectively over multiple products and services, or their revenue streams. Categorization is also useful for grouping products, services, or revenue streams in reporting applications.

Each tax component is defined by the user as a list of taxes that may apply to the particular revenue stream of a product or service, or to a particular category of revenue or product/service. The list enables multiple tax jurisdictions to be supported. The user can also identify the order of application of individual taxes to allow for compounded effects (i.e. tax-on-tax). For each tax component, an accounting allocation is created.

The user can also set expressions for price adjustments, such as premiums and/or discounts. Price adjustments may be applied to a single revenue stream of a product or service price, to multiple revenue streams, or to revenue categories spanning a number of products or services. Each price adjustment component is associated with an account. The user may set the price adjustment to be applied always to a particular product, service, or revenue stream, or to be applied selectively based on the customer, the product or service, or the transaction. For example, price adjustments can apply for a limited time. This feature is particularly useful for accommodating sale pricing. The user can also establish multiple future price adjustments. For instance, the user may set a limited time promotion involving five weekly changes over the next five weeks. Scheduled adjustments can also be cancelled.

A user can define distinctive pricing adjustments for specific groups of customers by setting up rate packages. The rate packages may depend on customer affiliations. For example, a merchant may set up a preferred customer rate package called "Gold". Gold customers get a volume discount of $1.00 off each item purchased, for purchases of more than 5 items. An expression for the Gold package is defined as: (if qty>5, −$1.00×qty, 0). This expression should be read as an "if-then-else" syntax, with commas separating each separate argument or node. Thus, if the quantity of the item purchased is greater than 5, the Gold customer gets $1.00 off each item. The "else" argument would throw a zero value, in this case, meaning that the default expression for calculating the price of the item would apply if there are less than 5 items.

The user can also define multiple price adjustments to be applied in two different ways to a transaction. First, a "best price" option can be selected which considers all price adjustments and applies the price adjustment(s) offering the best price for the customer. Second, a user can set "priority levels" to determine the order in which multiple price adjustments are applied.

Characteristic-based attributes can be included in the product or service definition (such as, the attribute "mohair" attributed to a product "sweater") to allow tracking of transactions with a particular attribute. Attributes can be associated to any price component (revenue, royalty, price adjustment, or tax). When an attribute is defined as calculation-affecting, it signals that the attribute should be factored in the calculation of the component. Attributes are user-defined. An example of a price-affecting attribute is an attribute labelled as "Cost", which may be factored in the calculation of a revenue component by adding a pre-defined mark-up amount to the "Cost" attribute, which is a variable.

As seen above in the rate package example, the syntax of expressions can be expressed in an "if-then-else" format.

Expressions may also be mathematical formulae. Or, an expression may use the operators "min" and "max". These expressions are particularly useful for setting a floor and/or ceiling value for the component. For instance, the following expression will return a value of $5.00 per unit, up to a maximum of $1000.00: Min(Quantity*5, 1000). Useful current operators include: if, and, not, or, <, >, min, max, +, −, *, /, ( ). Preferably, the system is also capable of supporting unlimited future operators and functions (without programming changes to the price calculation program or the Product Administration module).

The Product Administration module preferably includes an audit trail, allowing the user to track changes to the product definitions, price adjustments, and component changes. There are many benefits of such an audit trail. Using the Product Administration module (or a separate reporting application), a user can generate a variety of reports, such as an audit trail showing all changes to the component definitions in the last 6 months. The Product Administration module also preferably allows the user to retrieve information that has been entered by various types of search queries.

Once the products and services are defined with their attendant categories, revenues, tax and disbursement treatments, attributes and price adjustments, according to the method a pricing tree of separate components may be created when a transaction is initiated by a customer.

The method is now described by reference to a sample transaction illustrated in FIGS. 4-6. FIG. 4 shows a simple version of a purchase transaction initiated by a customer. A user-developed front-end web application would be used by the customer initiating the transaction, which is preferably similar in function to the Demo Unity™ front-end shown in the top half of screens in FIGS. 4-6. The screen shot is not intended to limit the possible form or content of such front-end. The split screen (having top and bottom halves) is preferably what would be seen by the user administrator as a customer transaction is invoked.

After selecting the product or service (called "Government" in this case), the customer in the example enters the desired quantity of the product or service 401, followed by a non-price affecting attribute 402 ("Iro" is identified as 50, in this case), and a price affecting attribute 403 (desired number of pages is entered as 125, in this case).

The bottom half of the screen shown in FIG. 4 reflects the pricing tree components retrieved for the customer's product selection. Two revenue components are retrieved as associated branches of the pricing tree for "Government" 404. First, a value add revenue stream is retrieved, which will have a value equal to the quantity entered at 401 (i.e. 1). A designated account number (54587634968) will be credited with the value add revenue stream amount 405. Second, a statutory revenue stream is retrieved, which will have the value calculated from the expression (NumberOfPages*2) according to the information entered at 403 (i.e. 125*2=250). A designated account number (3248736456) will be credited with the statutory revenue stream amount 406. As sub-branches of the value add revenue stream, two taxes (GST and PST) are retrieved for the customer and the product type 407, which will be credited to two further accounts 408, 409. (Note that for the purpose of the example, Canadian taxes are specified. GST is a type of value-added goods and services tax, while PST is a type of sales tax. It will be understood that the invention supports any type of local, regional or national tax definition, to suit a particular jurisdiction, or multiple jurisdictions.) In addition, a royalty component is retrieved with the expression (NumberOfPages*1.5) which will result in an amount of 187.50 being debited and credited 411. The credit will be applied to an Accounts Payable account designated by the user. The non-price affecting attribute (Iro) 402 is not retrieved as a price component.

FIG. 5 carries forward the example to the calculation stage. Now a resulting price for the customer will be calculated for the product. The statutory and value add revenue components determined in FIG. 4 are populated with the values entered by the customer, and a total pre-tax amount 501 is calculated at $251.00. The GST and PST components are also populated and calculated on the value add component of $1.00, and are respectively $0.08 and $0.07. These are then added to the total pre-tax amount 501 to determine the total (resulting price) for the customer 504 of $251.15.

As shown in the bottom half of the screen view, there are two revenue components calculated (value add 505 and statutory 508). The value add revenue stream, as shown, has two related tax components (GST 506 and PST 507). In addition, there is a Government royalty of $187.50 which is calculated 509.

The list of components in the bottom half of the screen illustrates the persistent separation of the components of the pricing tree, even after the resulting price is calculated 504. Note that the royalty amount, as a user-side disbursement, does not affect the resulting price for the customer, in this case, but it is tracked as a component for the user's own records and to facilitate batching and payment of the royalty owing to the royalty payee.

Figure 6:
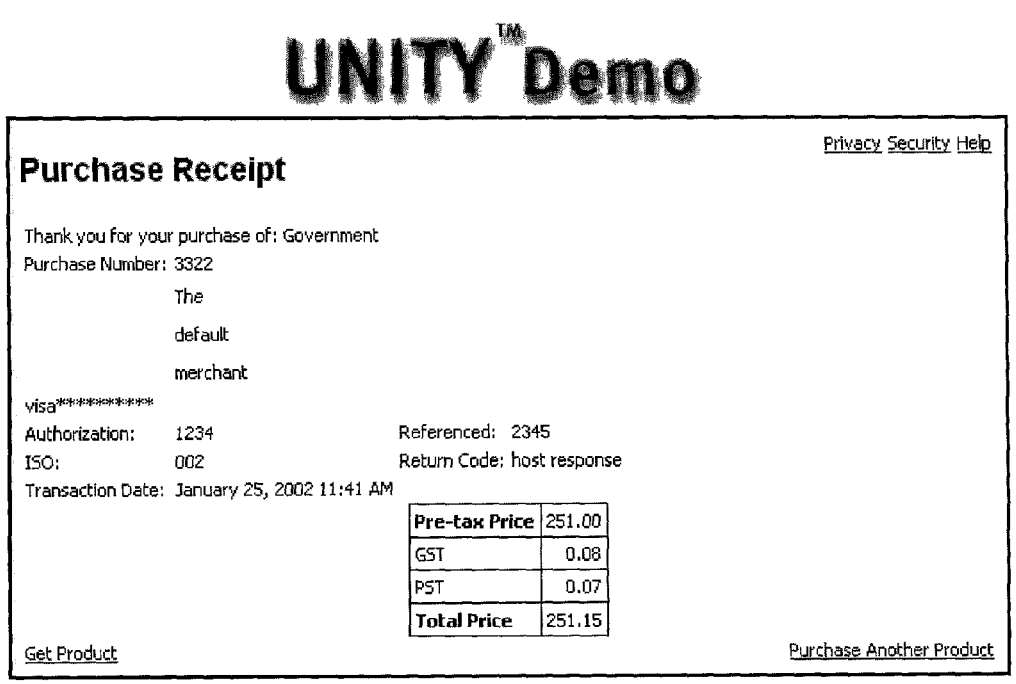
FIG. 6 is a sample screen shot of a purchase receipt and accounting allocation screen.

Finally, in FIG. 6, the resulting price in the illustration transaction has been passed to a collection module, to allow the customer to pay for his/her purchase (step not shown), and a receipt is generated showing the price information.

In the bottom half of the screen, the purchase is noted with its identification and time information 601, 602, 603, the amount collected 604, and the effective date of the payment 605. The Accounting details are posted including the resulting price charged to the customer (which is itself a "component" of the pricing tree), in addition to, the component amounts allocated to the various credit accounts 606. The royalty accounting is separated from the price-affecting components 607.

While the method invokes a calculation method, the calculation of the resulting price does not displace the individual components making up the price, including multiple revenue streams, and tax treatments, in this case. In addition, royalty amounts are calculated and are tracked separately to allow periodic disbursements to be paid by the user, and to allow the user to audit the royalty calculations over individual purchases or a series of purchases.

Figure 2:
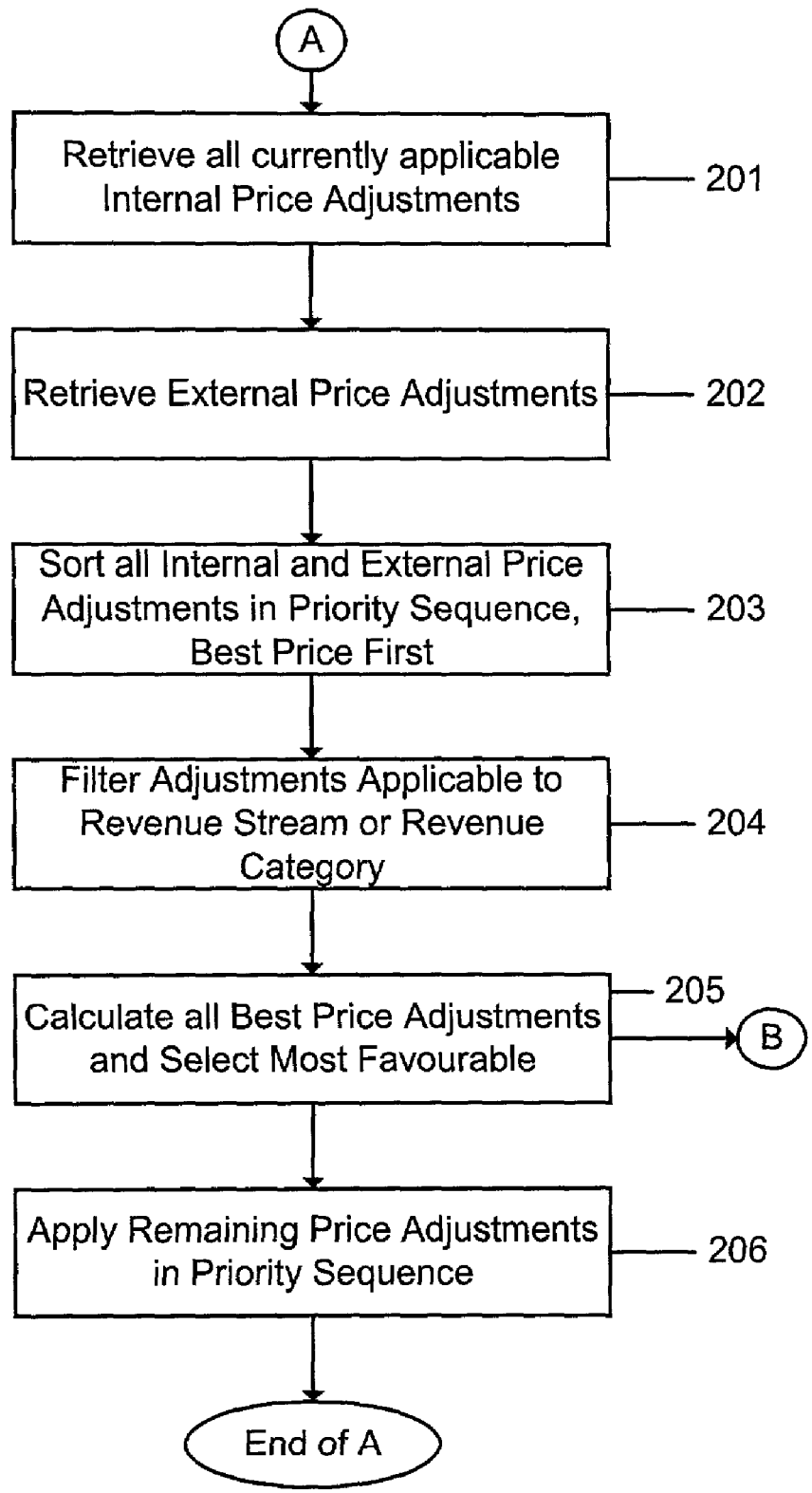
FIG. 2 is a detailed flow diagram of process A according to the method.
Figure 3:
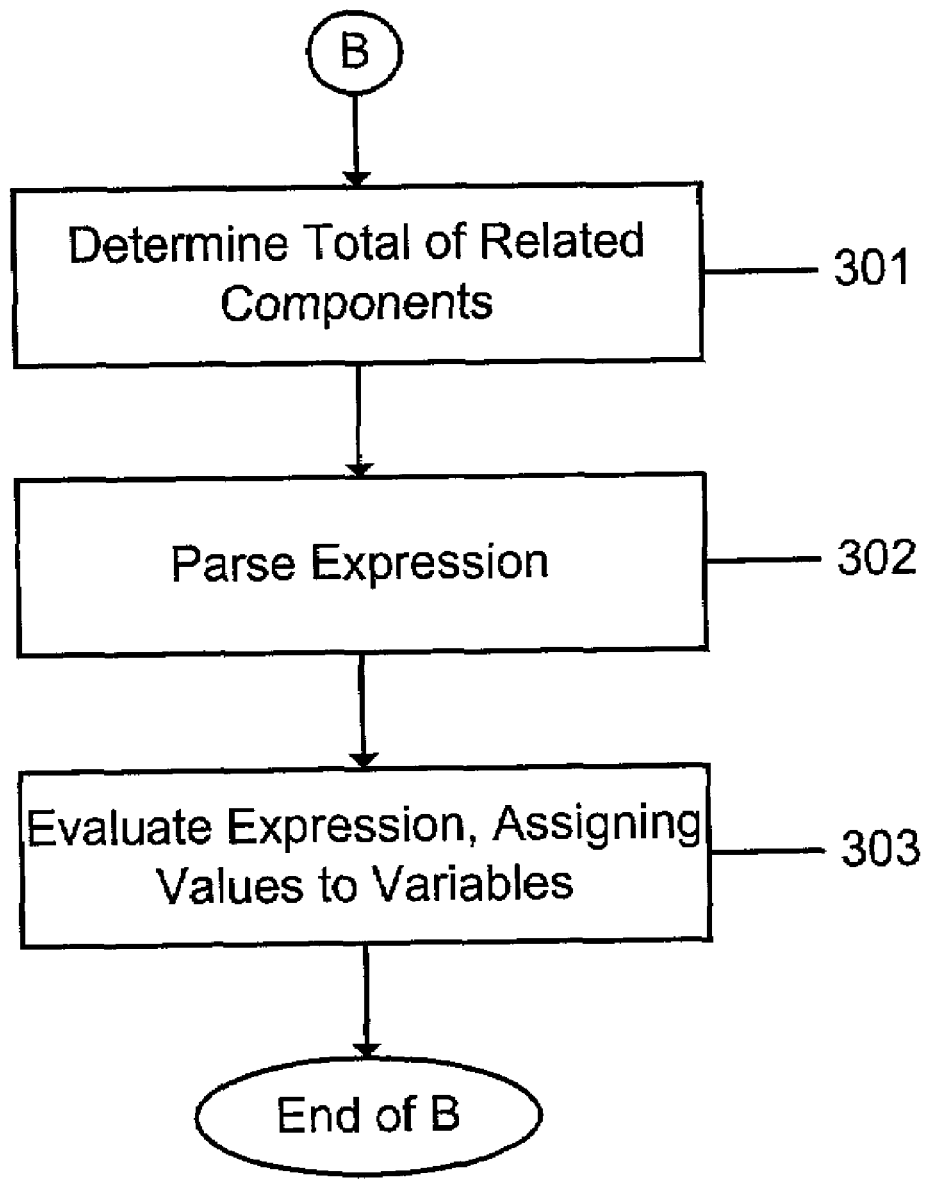
FIG. 3 is a detailed flow diagram of process B according to the method.

Turning now to FIGS. 1-3, the generic flow of the method of constructing and maintaining the pricing tree may be understood from the following description. The example in FIGS. 4-6 conforms to this generic flow and is useful to bear in mind as an illustration of the concepts. According to FIG. 1, a program, here described as a "CalculatePrice" EJB method, is initiated 101 as the customer enters and/or selects information applicable to the item transaction for the product or service. In Java 2 Enterprise Edition™ (J2EE), the form is sent to a servlet which calls the CalculatePrice EJB method, the servlet then redirects to a Java Server Page™ (JSP) which creates the page display. The program is passed a number of variables from the customer-facing front-end application—a product (or service), a quantity, one or more product attributes (if applicable), one or more customer taxes (if applicable), one or more rate packages (if applicable), an effective date, and one or more price adjustments (if applicable). Some of these variables are populated directly by the entries and/or selections made by the customer (such as, product, quantity, and attribute), while others are populated by going through a process to identify all applicable expressions (such as, customer tax, rate package), while still others are populated based on information generated by the front-end or back-end application itself (effective date). Not all variables will always apply—or a variable may pass a zero value. It will be understood that "variables" as used herein refers to any type of persistent or temporary information capable of being passed to the program, including arrays of such information.

Once the information is passed to the program, applicable revenue streams are retrieved for the given product or service 102, according to the revenue streams associated to the product or service defined by the user. For each revenue stream, an initial price component is calculated. Recalling the example in FIG. 4, the revenue stream "Statutory" in that example, had a calculation expression (NumberOfPages*2). The initial price component of "Statutory" would be populated with 125*2, the calculation of which returns $250.00.

Next, any applicable price adjustment components may be further retrieved and applied 104. The process of calculating price adjustments is described in more detail below with reference to FIG. 2.

Applicable royalties (disbursements) and taxes are retrieved for the product or service at steps 105, 106. Before calculating the tax component(s), the taxes retrieved must be filtered to only those applicable to the customer 108 (according to their jurisdiction and/or tax exempt status, passed in the CustomerTax variable in step 101). Applicable taxes are then sorted into their predefined sequence 109. Tax-on-tax treatments may be provided. The calculation method for price adjustment, royalty and tax expressions is described in more detail below with reference to FIG. 3.

It will be understood that, to reverse a transaction, a reverse pricing tree can equally be created. To do a reversal, the original pricing tree is retrieved. A ratio of returned quantity to remaining (yet to be returned) product quantity is then calculated. That ratio is applied to reverse the components of the pricing tree, in the appropriate proportion (representing the quantity of the returned item(s)).

In FIG. 2, the method for calculating price adjustments is described in more detail. The currently applicable internal price adjustments are preferably retrieved 201, followed by the external price adjustments 202. Internal price adjustments are price adjustments that are retrieved from the product definition itself or the category of the product or revenue (e.g. 10% discount on sweaters) and are always applied. External price adjustments are retrieved directly from the front-end application and are discretionary adjustments (i.e. they may or may not be passed to the program at the discretion of the user). These would include price adjustments "manually" applied by the user at the time of the customer's purchase (e.g. millionth customer discount). All of the internal and external discounts are sorted according to the sequence set by the user in the definitions, or as determined by a Best Price first rule 203 (A "Best Price" option can be selected by the user when the price adjustment is defined, ensuring that this adjustment will always be considered first). The adjustments are then filtered to catch only those applicable to the particular revenue stream or revenue category 204. Then, the price adjustment expressions are calculated to compare and find the Best Price 205 (among those marked "Best Price" adjustments). Finally, the remaining price adjustments (those not marked "Best Price") are applied in the priority sequence set by the user 206. The resulting value is the value of the price adjustment component, which is then passed back to the program. If no price adjustments have been defined for the product or service, this method will not be applied.

In FIG. 3, the method for calculating expressions is described in more detail. Preferably, the first step in the process is the determination of the Total of related components 301. Related components refers to any other components related to the current component, as shown in the following chart:

| Component | "Related" Components |
| --- | --- |
| Tax | Associated Revenue |
| | Dependent tax (if any) |
| Royalty | Associated Revenue |
| | Price Adjustment(s) applicable to the Associated Revenue (if any) |
| Price Adjustment | Associated Revenue |
| | Previous Price Adjustment(s) applied to the Associated Revenue (if any) |
| Initial Price | (None) |

For royalties, Total is the net revenue (i.e. the initial revenue component plus/minus any price adjustments). For taxes, Total is the net revenue plus the amount for the tax (if any) that this tax applies to. For price adjustments, Total is the base revenue plus/minus any price adjustments that have already applied (i.e. in priority sequence). For the Initial Price, Total of related components always returns zero.

The next step in calculating the expression is to parse the calculation string into nodes 302. A node is a part of an expression. The nodes for the expression are then evaluated. Some nodes can be constants (such as, the value '4'), while others require the parser to look for the value of the elements to populate certain variables (such as, nodes with a value of 'quantity', 'total', or 'attribute1'). These values would have been passed to the parser by the pricing module and indirectly from the customer-facing front-end application. Finally, those nodes that are expressions in themselves must implement the specific function (e.g. 'min', '<') that is set out in that node 303. Nodes are evaluated in order of operations, which may be adjusted by the inclusion of ( ) in the expression. The resulting calculation will be passed back to the program in order to supply the value of the component instance.

The foregoing is considered as illustrative only of the principles of the invention. Further, since numerous modifications and changes will readily occur to those skilled in the art, it is not desired to limit the invention to the exact steps and systems shown and described, and accordingly, all suitable modifications and equivalents may be resorted to, falling within the scope of the invention and the appended claims and their equivalents.

All patents and patent applications are incorporated by reference in their entirety to the same extent as if each individual patent was specifically and individually indicated to be incorporated by reference in its entirety.

What is claimed is:

1. A method of providing a price structure for a transaction relating to a complex product or service to be provided by multiple providers in a business relationship, within an electronic commerce back-end platform, and comprising:

providing a product administration interface for the providers to define their respective revenue streams for the product or service, and to collaboratively define business rules to determine a price structure of a tangible product provided by one or more of the multiple providers or a service rendered by one or more of the multiple providers;

providing a customer interface for performing a transaction with respect to the product or service at a transaction price;

providing within a computer memory, responsive to both the product administration interface and the customer interface, a pricing tree of price components for a unit of each transaction with respect to the product or service, the components comprising:

a first revenue stream representing funds to be distributed in whole or in part to a first provider; and a second revenue stream representing funds to be distributed in whole or in part to a second provider; and the revenue streams altogether making up the transaction price; wherein the components stay discretely allocated in the pricing tree, and wherein the components of the pricing tree are stored independently from the product or service, and wherein the components are automatically accounted for within the computer memory to permit the funds to be distributed at predetermined.

2. The method of claim 1, wherein the components further comprise a first price adjustment applied to one or both of the first revenue stream and the second revenue stream.

3. The method of claim 2, wherein the first price adjustment comprises a discount.

4. The method of claim 2, wherein the first price adjustment comprises a surcharge.

5. The method of claim 2, wherein the components further comprise a second price adjustment applied to one or both of the first revenue stream and the second revenue stream in addition to the first price adjustment.

6. The method of claim 5, wherein the first price adjustment and second price adjustment are applied in a predetermined sequence.

7. The method of claim 5, wherein the first price adjustment and second price adjustment are applied in the sequence resulting in the lowest resulting price.

8. The method of claim 1, wherein the components further comprise a first tax applied to one or both of the first revenue stream and the second revenue stream.

9. The method of claim 8, wherein the components further comprise a second tax applied over the first tax.

10. The method of claim 1, wherein the components further comprise at least one disbursement, comprising a part of the first revenue stream or the second revenue stream allocable to the first provider or the second provider, the disbursement being allocated as a component without affecting the transaction price.

11. The method of claim 10, wherein the disbursement comprises a royalty.

12. The method of claim 11, wherein the royalty comprises a fixed or variable amount.

13. The method of claim 1, wherein a component comprises at least one attribute.

14. The method of claim 13, wherein the attribute is a price-affecting attribute.

15. The method of claim 13, wherein the attribute is a non-price-affecting attribute.

16. The method of claim 1, wherein the method further includes applying a time/date argument to calculate a component.

17. The method of claim 1, wherein the method further includes applying a rate package argument to calculate a component.

18. The method of claim 1, wherein the method comprises a method of constructing and maintaining a price structure for a transaction relating to an electronically-delivered government service or product.

19. The method of claim 18, wherein the first revenue stream comprises a statutory revenue stream and the second revenue stream comprises a value-added revenue stream.

20. A system for providing a price structure for a transaction relating to a complex product or service to be provided by multiple providers in a business relationship, the system operating within an electronic commerce back-end platform, and comprising:

a product administration interface capable of receiving definitions from the providers of their respective price components and accepting business rules that have been collaboratively defined by the providers for manipulating their components, wherein the business rules are used to determine a price structure of a tangible product provided by one or more of the multiple providers or a service rendered by one or more of the multiple providers;

a customer interface capable of receiving information from a customer initiating the transaction with respect to the product or service at a transaction price;

a processor, in communication with the product administration interface and the customer interface, and executing software, the software comprising:

a pricing tree builder using the business rules for building a pricing tree of components for each transaction with respect to the product or service, the pricing tree including:

a first revenue stream representing funds to be distributed to a first provider;

a second revenue stream representing funds to be distributed to a second provider; and the revenue streams altogether making up the transaction price;

and a computer storage in communication with the processor for storing the business rules and components and the information, the storage capable of storing the components discretely in the pricing tree, and wherein the components of the pricing tree are stored independently from the product or service, to permit the funds to be distributed at predetermined intervals to the providers and to permit periodic reporting to the providers.

21. The system of claim 20, wherein the components further comprise a first price adjustment applied to one or both of the first revenue stream and the second revenue stream.

22. The system of claim 21, wherein the first price adjustment comprises a discount.

23. The system of claim 21, wherein the first price adjustment comprises a surcharge.

24. The system of claim 21, wherein the components further comprise a second price adjustment applied to one or both of the first revenue stream and the second revenue stream in addition to the first price adjustment.

25. The system of claim 24, wherein the first price adjustment and second price adjustment are applied in a predetermined sequence.

26. The system of claim 24, wherein the first price adjustment and second price adjustment are applied in the sequence resulting in the lowest resulting price.

27. The system of claim 20, wherein the components further comprise a first tax applied to one or both of the first revenue stream and the second revenue stream.

28. The system of claim 27, wherein the components further comprise a second tax applied over the first tax.

29. The system of claim 20, wherein the components further comprise at least one disbursement, comprising a part of the first revenue stream or the second revenue stream allocable to the first provider or the second provider, the disbursement being allocated as a component without affecting the transaction price.

30. The system of claim 29, wherein the disbursement comprises a royalty.

31. The system of claim 30, wherein the royalty comprises a fixed or variable amount.

32. The system of claim 20, wherein a component comprises at least one attribute.

33. The system of claim 32, wherein the attribute is a price-affecting attribute.

34. The system of claim 32, wherein the attribute is a non-price-affecting attribute.

35. The system of claim 20, wherein the software further comprises a time/date determiner for selectively applying a time/date-based business rule.

36. The system of claim 20, wherein the software further comprises a rate package determiner for selectively applying a rate package-based business rule.

37. The system of claim 20, wherein the system comprises a system for constructing and maintaining a price structure for a transaction relating to an electronically-delivered government service or product.

38. The system of claim 37, wherein the first revenue stream comprises a statutory revenue stream and the second revenue stream comprises a value-added revenue stream.

39. The system of claim 20, wherein each business rule comprises an expression.

40. The system of claim 39, wherein the expression includes at least one operator selected from the group consisting of: if, and, not, or, <, >, mm, max, +,−, *, /, ( ).

41. The system of claim 39, wherein the software includes an expression parser for parsing a plurality of nodes within an expression.

42. The system of claim 20, wherein the electronic commerce back-end platform comprises a modular platform for supporting an electronic commerce front-end application, the platform comprising modules for pricing, billing, accounting, collection and customer care, the modules being in communication with each other within the platform.

43. The system of claim 42, wherein the modules comprise Enterprise Java Bean™ (EJB) components.

44. The system of claim 42, wherein the software is in communication with an accounting module for passing component values to accounts in the accounting module.

45. The system of claim 42, wherein the software is in communication with a collections module to pass the resulting price to the collections module for initiating a collection from a customer.

46. A software program stored on a computer-readable medium, the software program comprising:
a pricing tree builder for providing a pricing tree of price components for a customer transaction with respect to a tangible product provided by one or more providers or a service rendered by one or more providers, the components being passed to the software from business rules defined collaboratively by multiple providers of a complex product or service in a business relationship with values passed to the software from a customer interface, wherein the business rules are used to determine a price structure of the tangible product or rendered service, the components representing the business relationship between the multiple providers and including:
a first revenue stream representing funds to be distributed to a first provider;
a second revenue stream representing funds to be distributed to a second provider;
the revenue streams altogether making up a transaction price payable by the customer; and
wherein the components are discretely stored during and after the transaction in the pricing tree, independently from the product or service itself, to permit the funds to be distributed at predetermined intervals to the providers and to permit periodic reporting to the providers.

47. The method of claim 1, wherein the product administration interface is constructed to permit changes to the business rules to reflect changes in the business relationship, or in the providers, without the need to reprogram the back-end platform.

48. The system of claim 20, wherein the product administration interface is constructed to permit changes to the business rules to reflect changes in the business relationship, or in the providers without the need to reprogram the back-end platform.

49. The software program of claim 46, wherein the pricing tree builder is constructed to permit changes to the business rules to reflect changes in the business relationship, or in the providers without the need to reprogram the software program.

* * * * *